J. G. HAGMANN.
WHEAT HEATER.
APPLICATION FILED JULY 31, 1911.
1,026,743.
Patented May 21, 1912.
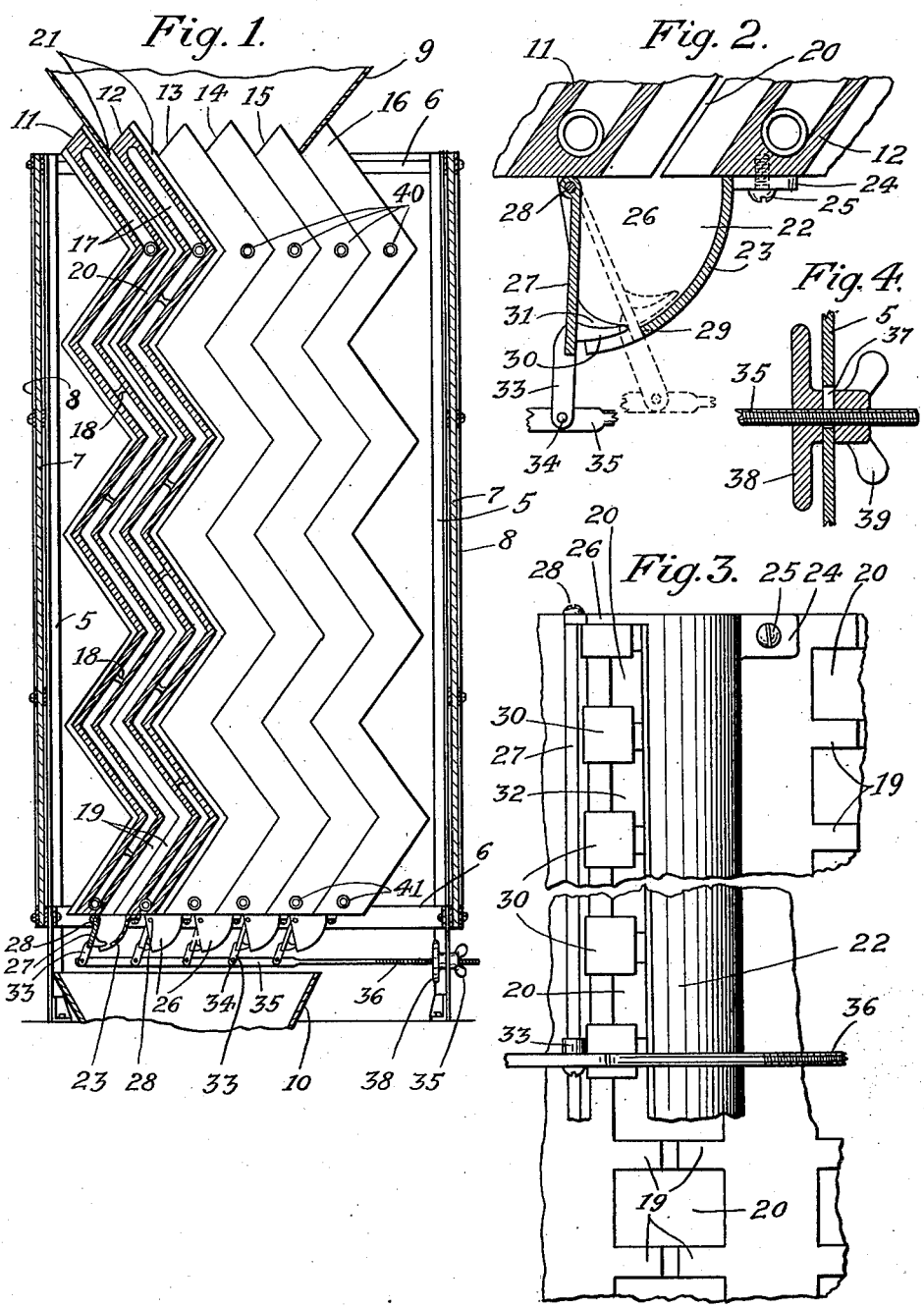
Witnesses:
Theo. Lagaard.
A. E. Hagen.
Inventor:
John G. Hagmann.
By F. A. Whiteley
his Attorney.

UNITED STATES PATENT OFFICE.

JOHN G. HAGMANN, OF LA CROSSE, WISCONSIN, ASSIGNOR OF ONE-HALF TO GEORGE M. HEATH, OF LA CROSSE, WISCONSIN.

WHEAT-HEATER.

1,026,743.  Specification of Letters Patent. Patented May 21, 1912.

Application filed July 31, 1911. Serial No. 641,641.

*To all whom it may concern:*

Be it known that I, JOHN G. HAGMANN, a citizen of the United States, residing at La Crosse, in the county of La Crosse and State of Wisconsin, have invented certain new and useful Improvements in Wheat-Heaters, of which the following is a specification.

My invention relates to wheat heaters and has for its object to provide a device into which the wheat may be fed, flowing through crooked passages therein in contact with heated surfaces whereby the wheat will be dried and heated to the desired extent.

A special object of my invention is to provide an arrangement of discharge hoppers and valves by which the rate of flow of the wheat through the heater may be accurately regulated.

Other objects and advantages of my invention will appear in connection with the detailed description thereof and are particularly pointed out in the claims.

In the drawings illustrating the application of my invention in one form,—Figure 1 is a side elevation partly in section of a wheat heater constructed in accordance with the principles of my invention. Fig. 2 is an enlarged sectional elevation of a discharge hopper and valve gate. Fig. 3 is a fragmentary plan view of the bottom across a section of the heater showing one of the valve gates in open position. Fig. 4 illustrates a mode of securing the valve gates in adjusted position.

Vertical frame members 5 are secured together by transverse members 6 forming the framework of the heater which may be covered with a lining 7 of asbestos material and an outer casing 8 of sheet metal. Within this structure the heating devices are arranged and a feed hopper 9 is provided at the top by means of which grain is introduced into the heating passage-ways, a similar receiving hopper 10 being positioned below said passages into which the heated grain will be discharged from the apparatus and from which the grain will be conducted away to the point of storage or manufacture.

The heater elements are designated 11 to 16, inclusive, each section being of like construction and all of the sections being placed in coöperative position within the casing to provide the heating passages for the grain. Each section consists of a relatively long and shallow metal body, preferably cast, providing a tight chamber 17 for the reception and passage of the heating fluid, which ordinarily will be steam. The walls of the said heating members may be braced by bridge studs 18, and are provided on both sides with longitudinal ribs 19. The members, including the ribs 19, are formed in zigzag manner with a plurality of short, straight portions angularly connected with one another. The inner passages 17 taper gradually from the top to the bottom, the distance between the outer edges of the ribs being the same throughout the lengths of the members so that when the members are placed in position, one in contact with the other, there will be produced a series of intermediate zigzag channels 20 that widen gradually between the sections from the intake openings 21 in hopper 9 to the discharge openings at the bottoms of said channels.

Secured to the bottom of each of members 12—16 is a discharge hopper 22, said hopper comprising a curved back plate 23 having thereon flange lugs 24 by which the hopper is secured to the bottom ends of the heating members by means of screws 25. The ends of these hoppers are closed by means of segmental plates 26, and a movable front wall 27 is pivotally connected at each end of the upper edge thereof, as shown at 28, to the inner sides of said segment walls 26. The segmental plates 26 extend forwardly some distance beyond the front edge 29 of the curved back plate 23 of hoppers 25, so that when said walls are swung forwardly a downward opening is formed between the said edges 29 and walls 27, said walls 27 thus forming swinging gate valves by means of which this opening can be accurately determined to regulate the rate of flow of wheat through the heater. The lower edge of each of the gates 27 is provided with a series of inwardly extending plates 30 which plates are curved on the lower portion thereof and positioned so as to register within the curved wall 23 when gates 27 are closed, as shown in Fig. 2. The plates 30 are formed with a web-like separator 31 on the top thereof between said plates and the gate 27. These plates operate to divide the opening formed between gate 27 and lower edge 29 of curved member 23 into a series of short rectangular openings 32, as best shown in Fig. 3, each of said openings preferably being immediately below one of the heating channels 20 and all of said openings being directly above receiving hopper 10.

Each of the gates 27 has rigidly extended from the central portion thereof an arm 33 pivotally connected at 34 to an adjusting rod 35. Said rod is so connected to all of the arms 33 as to hold all of the gates 27 in parallel relation, thus being pivotally suspended from said gates. By moving rod 35, therefore, longitudinally, all of said gates will be simultaneously swung on their pivots 28 to open or close to the degree required the bottoms of discharge hoppers 22. One end of rod 35 is threaded, as shown at 36, said end extending through an elongated opening 37 in a vertical frame member 5, to which said rod may be secured and locked in adjusted position by any suitable means, an inner hand-nut 38 and outer thumb-nut 39 threaded upon said end 35 providing satisfactory means for that purpose.

In operation, steam will be turned into members 11—16 by means of pipes entering said members through openings 40 and leaving through similar openings 41. The wheat will then be run into hopper 9 from which it will flow downward through zigzag passages 20 until it reaches discharge hoppers 22. Valve gates 27 will then be opened to the extent required by the kind and condition of wheat passing through the heater and the degree of heating thereof which is desired. The gates 27 may be so opened as to cause the wheat to flow very slowly through the heater, in which case a high degree of heating will be effected thereupon, or said gates may be opened so that the wheat will run through rapidly and the heating action be proportionately less, this effect being largely aided by the plates 30 breaking up the exit opening into rectangular passages, since, if the gates were open throughout their entire length sufficiently to permit wheat to flow at all such opening might be so great as to cause the wheat to flow too rapidly for some required conditions of heating action.

The individual sections 11 to 16 are identical in structure and are interchangeable. Also, by so mounting the sections that the ribs 19 will not actually contact, as shown in Fig. 3, one section may be removed edgewise from the entire heater without disturbing the others.

The heater will operate effectively on wheat in any condition, even very wet wheat, and this is rendered practicable through the valve gate controlling mechanism, which is accurate and positive in its action to a high degree.

I claim:

1. A grain heater comprising a plurality of irregular heating bodies forming heating passages therebetween open at top and bottom, a discharge hopper below said openings comprising a curved back wall and end walls, a gate pivotally mounted to swing between said end walls in the arc of curvature and against the forward edge of said back wall, said gate including curved plates extending within said curved wall, means to move said gate positively to open said hopper, and means to lock the gate where moved.

2. A grain heater comprising a plurality of zigzag heating sections provided with longitudinal ribs and being vertically arranged so as to provide a series of grain passageways between each pair of sections, said passageways having bottom openings extending in a line, an undivided discharge hopper positioned below all of said openings for each of said series, said discharge hopper comprising a curved back wall and end walls, a gate pivotally mounted to swing between said end walls in the arc of curvature and against the forward edge of said back wall, said gate including curved plates extending within and engaging said curved wall, and means to move said gate positively to open said hopper in a plurality of places beneath said line of passageways.

3. A grain heater comprising a plurality of irregular heating bodies, said bodies being constructed and arranged to form a plurality of series of heating passages between adjacent pairs thereof, a common receiving hopper below all of said passages, a separate discharge hopper for each series of passages into which said series of passages open, a swinging gate forming one side of each of said separate hoppers, and means connected to each of said gates positively to move all of them simultaneously to open said hoppers, and means to lock the same where moved.

4. A grain heater comprising a plurality of irregular heating bodies, said bodies being constructed and arranged to form a plurality of series of heating passages between adjacent pairs thereof, a common receiving hopper below all of said passages, a separate discharge hopper for each series of passages into which said series of passages open, a swinging gate forming one side of each of said separate hoppers, arms on each of said gates extending centrally therefrom in parallel relation, a rod pivotally connected to each of said arms whereby all of said gates may be simultaneously and positively moved to open said hoppers, one end of said rod being threaded and extending through an elongated aperture in a frame member, and hand-nuts on said threaded end for securing said rod in any desired position.

5. A grain heater comprising a plurality of zigzag heating sections provided with longitudinal ribs and being vertically arranged so as to provide a series of grain passageways between each pair of sections, said passageways having bottom openings extending in a line, an undivided discharge hopper positioned below all of said openings for each of said series, and means movable as a unit to effect opening of said hopper in a plurality of distinct and separated places beneath said line of passageways.

In testimony whereof I affix my signature in presence of two witnesses.

JOHN G. HAGMANN.

Witnesses:
ELIZABETH E. BONHAM,
MATILDA JOHNSON.

---

Copies of this patent may be obtained for five cents each, by addressing the "Commissioner of Patents, Washington, D. C."